(12) United States Patent
Valtonen

(10) Patent No.: US 8,489,061 B2
(45) Date of Patent: Jul. 16, 2013

(54) METHOD AND SYSTEM FOR RELAYING AND MANAGING CALL MESSAGES

(75) Inventor: Kauko Valtonen, Turku (FI)

(73) Assignee: Oy Exrei Ab, Turku (FI)

( * ) Notice: Subject to any disclaimer, the term of this patent is extended or adjusted under 35 U.S.C. 154(b) by 592 days.

(21) Appl. No.: 12/162,714

(22) PCT Filed: Jan. 22, 2007

(86) PCT No.: PCT/FI2007/050033
§ 371 (c)(1),
(2), (4) Date: Jul. 30, 2008

(87) PCT Pub. No.: WO2007/088242
PCT Pub. Date: Aug. 9, 2007

(65) Prior Publication Data
US 2009/0016511 A1    Jan. 15, 2009

(30) Foreign Application Priority Data
Jan. 31, 2006    (FI) ...................................... 20060093

(51) Int. Cl.
*H04M 11/04* (2006.01)
*H04M 3/42* (2006.01)
*H04B 7/00* (2006.01)

(52) U.S. Cl.
USPC ............ 455/404.1; 455/521; 379/37; 379/45; 379/201.02

(58) Field of Classification Search
USPC .................... 455/404.1, 445, 521; 379/201.2, 379/37, 38, 45
See application file for complete search history.

(56) References Cited

U.S. PATENT DOCUMENTS

| | | | |
|---|---|---|---|
| 6,280,380 B1 * | 8/2001 | Bardy | 600/300 |
| 6,292,542 B1 | 9/2001 | Bilder | |
| 7,212,111 B2 * | 5/2007 | Tupler et al. | 340/539.18 |
| 7,298,833 B2 * | 11/2007 | Klein et al. | 379/201.02 |
| 2004/0015132 A1 * | 1/2004 | Brown | 604/131 |
| 2005/0143048 A1 | 6/2005 | Binning | |
| 2005/0201529 A1 | 9/2005 | Nelson et al. | |
| 2006/0128357 A1 * | 6/2006 | Suryanarayana et al. | 455/404.2 |

FOREIGN PATENT DOCUMENTS

| | | |
|---|---|---|
| DE | 2 158 278 | 5/1973 |
| EP | 1 205 896 | 5/2002 |
| EP | 1 316 934 | 6/2003 |
| WO | WO 96/19908 | 6/1996 |
| WO | WO 99/21380 | 4/1999 |
| WO | WO 0209337 | 1/2002 |
| WO | WO 03/017694 | 2/2003 |
| WO | WO 2005/069848 | 8/2005 |

\* cited by examiner

*Primary Examiner* — Kent Chang
*Assistant Examiner* — Scott Au
(74) *Attorney, Agent, or Firm* — Young & Thompson

(57) ABSTRACT

The object of the invention is a method and a server for relaying and managing service calls. The invention is suitable, for example, for relaying and managing calls related to alarm and care services. The objective of the invention can be attained with a solution wherein the calls are routed from the customer terminal (230, 250) to a server (210) for relaying as an assignment to the service terminals (270) of service providers. The server (214) shall be programmed not only with the contact information of the service providers but also with additional service provider data based on which the service to which the assignment is to be sent is chosen. By using suitable additional data and selection criteria, the system can yield an efficient, quick, and affordable solution for relaying services.

39 Claims, 2 Drawing Sheets

METHOD AND SYSTEM FOR RELAYING AND MANAGING CALL MESSAGES

Figure 1:
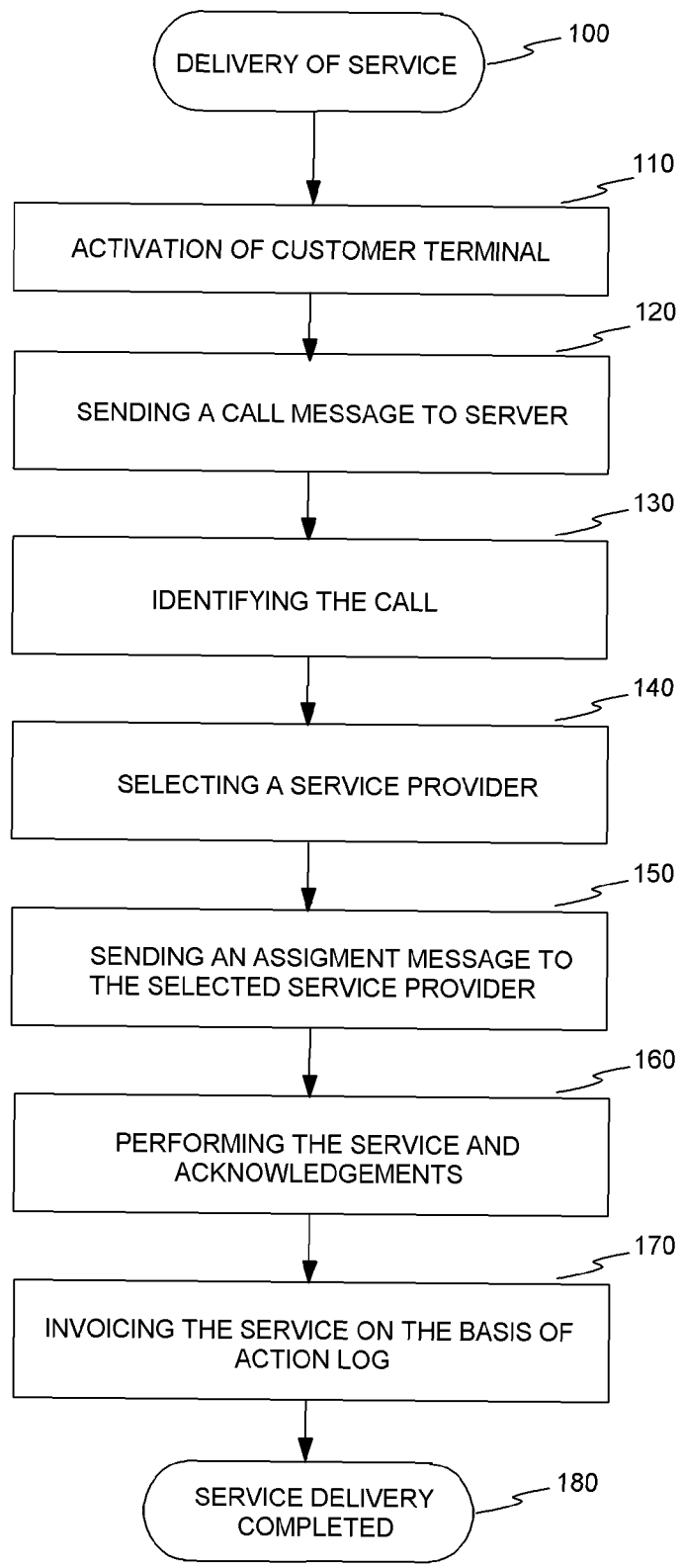

The object of the invention is a method and arrangement for relaying and managing service calls. The invention is suitable, for example, for relaying and managing calls related to alarm and care services. A 'service call' here refers to the relaying of any information that is related to the proclamation or assessment of a service need either automatically or as activated by a human. 'Service provider' here refers primarily to the person rendering services corresponding to the calls.

Ageing people in particular often find a need for services that may involve health care, home care, or tending to other matters. In particular, calling for services related to urgent health care needs should be quick and effortless.

Safety phone systems, among others, have been developed for calling for help. A safety phone can be activated, for example, by pressing a button on the phone or via a separate wristband. One or several contact entries are stored in a safety telephone with which to establish a telephone connection during activation of the safety phone. The connection can be established e.g. with a call reception centre on duty, where a duty officer determines the need for help and, if necessary, makes a further report to a suitable service provider. The reception centre also may have a computer system in which the duty officer records the call events and any service resources and contact information in use at any given time.

There are, however, certain problems involved with using the reception centre. A dedicated facility and duty personnel are required for the centre, which incur considerable expenses. Particularly in areas where the number of customers requiring services is low, it is not possible to arrange for dedicated on-duty service, for cost reasons. Another alternative is, therefore, to route the calls from a safety phone directly to the service provider instead of the centre. It is possible to program several contacts into the safety phones, for the phones to contact in a pre-set order until a connection has been established.

Nonetheless, there are problems even with a solution where the service calls are sent directly to the service provider. Should a safety phone need to call several service providers before establishing a connection with a responsive one, there may be a significant time delay. Secondly, should the safety phones of several customers be programmed in identical patterns, the calls will be divided unevenly among the service providers. Furthermore, should service providers change often, contact information must be updated repeatedly in the safety phones. This could, however, be avoided if the service providers' phones were not personal but always used by the officer on duty. Even this solution has the fundamental problem that service providers need to transfer telephones from person to person during shift changes and in cases of unexpected absences.

Furthermore, there are certain reliability problems involved with solutions utilising safety phones. When, for example, a safety phone sends a voice message produced by a robot, the service provider may not be able to write it down if driving, for instance. Therefore, it is possible for the message to be forgotten completely, and thus for the required service not to be rendered.

The objective of the invention is to achieve a new solution that allows for diminishing the problems involved with the prior art concerned.

The objective of the invention can be attained with a solution wherein the calls are routed from the customer terminal to a server for relaying as an assignment to the service terminals of service providers. The server will be programmed not only with the contact information of the service providers but also with additional service provider data based on which the service to which the assignment is to be sent is chosen. By using suitable additional data and selection criteria, the system can achieve an efficient, quick, and affordable solution for relaying services. The calls of the system can be activated by the customer or by a monitoring device. Furthermore, the system allows for transmitting calls and also collecting a variety of information from the customer's environment—for example, to aid in avoidance of hazards. Furthermore, the system can be used for controlling multi-function devices, such as pharmaceutical dispensers.

The innovation achieves considerable advantages over prior art. A system according to the invention requires neither personnel performing administrative update work nor facilities for this purpose. Therefore, expenses generally are incurred by only the service that the customer uses.

Additional data that can be saved on the server can include, among others, service-provider-specific information on the service hours during which the service provider receives assignments. Thereby assignments based on calls need not be sent in vain to instances that do not receive assignments at the time in question. The service provider may carry out storage of the presence data on the server in an affordable way using a service terminal, which makes it easy to keep the information up to date. Similarly, the server allows for managing a log of received calls and transmitted assignments as well as assignment acknowledgements. The service provider may further acknowledge the service as rendered by storing the acknowledgement information on the server. Thereby the server allows for monitoring to ensure that all assignments are executed, which results in high reliability.

The system also allows for taking the distance between the customer and the service provider into account in the choice of service provider. If necessary, positioning based on the radio transmission of customer and service terminals can be used, which allows for selecting the service provider closest to the customer. The data transmission of the system can utilise control centres that serve as base stations, which renders positioning and contact establishment between a customer terminal and the server possible in public spaces, for example, where such a control centre has been installed. This allows the customer to place service calls beyond the sphere of the customer's home environment and, in an emergency, for locating the customer for delivery of assistance.

A further advantage of the invention is that the customer terminals have no essential need for programming/updating of information. As the contact information for the service terminals of the service providers has been stored on the server, this information can be changed by the service provider. In such cases, the contact information for the customer terminals will not change. Therefore, a customer terminal covered by a system according to the invention can be deployed and kept in use without effort or the need for a technical expert.

The service terminal used by the service provider can be, for example, a regular digital mobile communication device. As the contact information of each service provider can be stored on the server, there is no need to transfer the terminal devices between service providers.

A method according to the invention for relaying and managing service calls, where the customer terminal sends a call and the service terminal receives an assignment, is characterised by the transmission of the call information from the customer terminal to the server, in which the server-based data on the service providers comprise data for establishing a connection to the service provider's service terminal and additional service provider data, whereby a call arriving at the server causes the server to select a service provider on the basis of the data contained in the call and said additional data, and to send an assignment based on the data of the call to the service terminal in accordance with the contact information of the selected service provider.

A system according to the invention for relaying and managing service calls that comprises customer terminals for sending calls and service terminals for receiving assignments is characterised by the system comprising a server that has memory for storing the information of the service providers, which comprises data for establishing a connection to the service providers service terminal and additional service provider data, and the system further comprises the means for relaying the call data from a customer terminal to the server, whereby the server is arranged to be activated upon the incoming call and select a service provider according to the data contained in the call and the said additional data, and to send an assignment based on the data of the call to the service terminal in accordance with the contact information of the selected service provider.

A server according to the invention for relaying and managing service calls in a system that comprises customer terminals for sending calls and service terminals for receiving assignments is characterised by a server that has memory for storing the information of the service providers, which comprises data for establishing a connection to the service provider's service terminal and additional service provider data, and the server further comprises the means for receiving call data from a customer terminal, whereby the server is arranged to be activated on the incoming call and select a service provider on the basis on the data contained in the call and said additional data, and to send an assignment based on the data of the call to the service terminal in accordance with the contact information of the selected service provider.

Advantageous embodiments of the invention are presented in non-independent claims.

Figure 2:
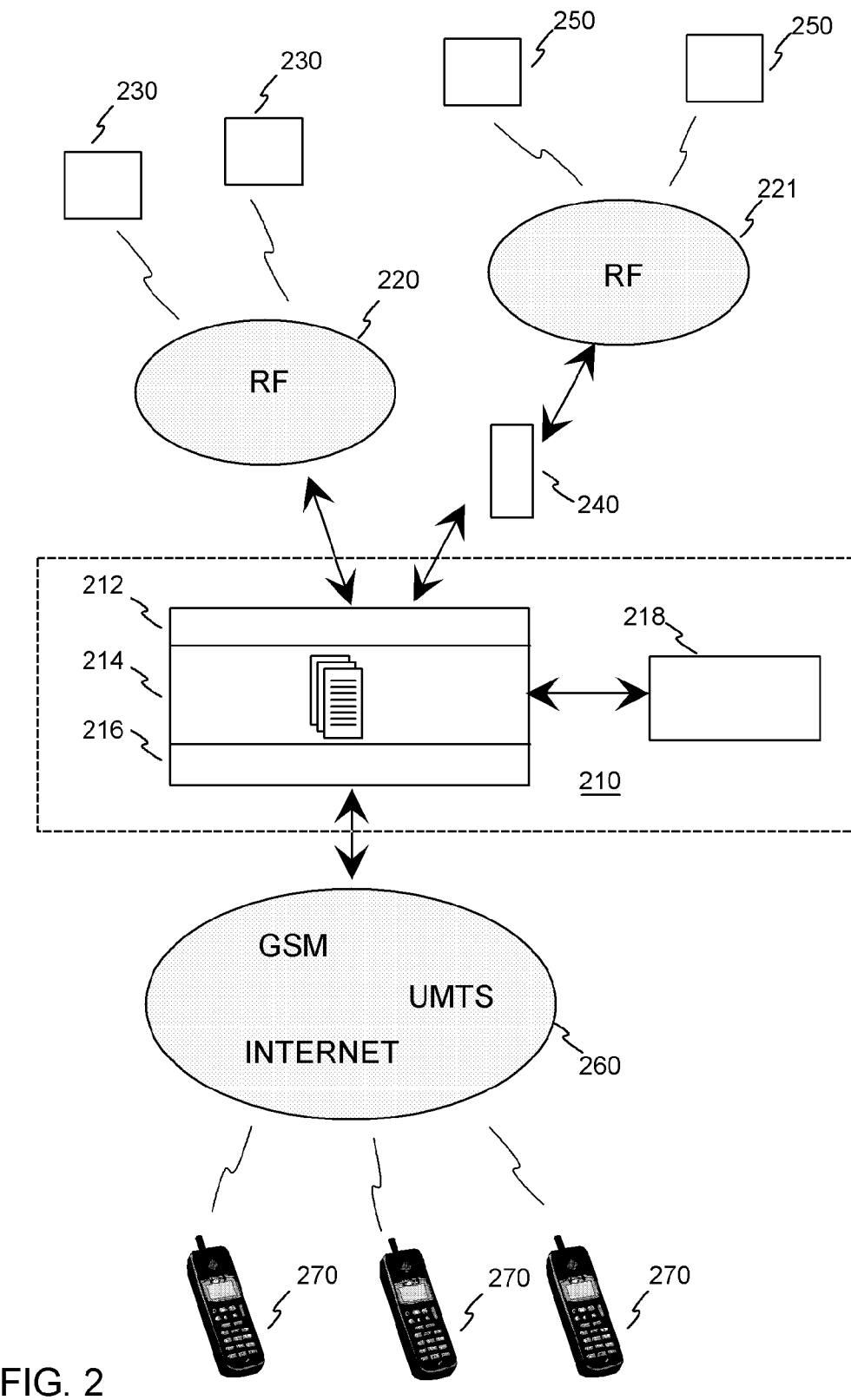

The invention is described in more detail below with the help of the attached drawings, where FIG. 1 presents a flow chart for the relaying and management of service calls via a certain method according to the invention, and FIG. 2 presents a block diagram for the relaying and management of service calls in a certain system according to the invention.

FIG. 1 shows a flow chart concerning a certain method, 100, according to the invention on the calling and delivery of services. Stage 110 is the activation of the service call. This may be triggered, for example, by pressing a button on the customer terminal or due to the activation of an alarm device that acts as a terminal device. As a result of the activation, the customer terminal creates a call message and sends it to the server, 120. The server receives the call and identifies the data in the call, 130. The data in the call message typically are the identification data of the customer terminal that sent the call and the reason for the call. After this, the server performs at least one selection of a service provider, 140. To select the service provider, the server reads additional service provider information, which provides a service suitable for the call. On the basis of the additional data, the server selects a service provider that is available or the one that has the least load at the moment of assessment. Also, which is the next provider in rotation for receiving an assignment and/or the nearest service provider can be taken into account. The position may be determined according to the basic locations of the customer and service provider stored on the server, or, alternatively, by determining the real-time locations of the customer and service terminals by means of positioning based on radio data transmission; this information is known, for example, in radio cell systems. It is also possible to select more than one suitable service provider to which service assignments are offered.

When the selection of the most suitable service provider has been executed, an assignment message is sent to the provider, 150. The assignment message typically contains the data on the call subject, obtained from the service call, and the customer's identification and position data. Prior to sending the assignment message, the server verifies that the selected service provider really is available. This can be done, for example, with a verification query sent to the service provider, to which the service provider must respond. This way, assignments are not sent to, for example, a communication device that serves as a service terminal but is not for some reason, in the service provider's possession at the moment or that has a depleted battery. This is done to ensure the delivery of the assignment and a reaction to it. As an alternative to a separate confirmation message, it is possible to require the service provider to confirm receipt of the assignment immediately such that, if this does not take place, the assignment is sent to the next service provider. In a certain embodiment, the server selects several service providers, each of which will be sent a query or assignment message. In this case, the assignment is assigned to the service provider first confirming it.

The service provider performs the desired service on the basis of the above information, 160. The call and assignment messages sent are advantageously acknowledged as received, using bi-directional data transmission, and the service provider furthermore acknowledges the service in an affordable way as completed after completion, 160. Thereby the server has a comprehensive log, which allows for later review of the actions taken and their times. This log can be utilised also in invoicing for services rendered, 170.

FIG. 2 presents a block diagram of a certain system according to the invention for the relaying and management of service calls. The system has a server, 210, which comprises a database, 214, that covers, for example, data pertaining to customers and service providers. The database is used by server processes, 218, which handle data in accordance with the above invention. The server has an interface for customer terminals, 212, which, among other things, carries out the conversion of information to be relayed in such a way that the information on the server is consistent regardless of the customer terminal or transmission method in use. The customer terminals can connect to the server using various transmission routes (220, 221). The most affordable way to connect is to use dedicated radio channels, such as those in the frequencies 868 MHz and 2.4 GHz. The information to be transmitted is to be encrypted in the most affordable way so as to avoid external access to the data contained in the system.

FIG. 2 presents customer terminals, 240, which are connected to the server, 210. Various operating devices can be connected to the customer terminals in either wired or wireless ways. Such operating devices might include emergency buttons, temperature sensors, stove guard systems, etc., which can activate a call or relay sensor information. FIG. 2 also presents a control centre, 240, serving as a base station to which a customer terminal, 250, can connect using the radio network, 221. Such a control centre allows the customer to establish a connection to the system beyond the normal area of residence, that the customer terminal's normal operating range does not cover.

The data transfer between a customer terminal and the server in a system according to the invention is affordably bi-directional. Thereby the server can acknowledge the service call as received. If the customer terminal does not receive acknowledgement of the service call, it resends the call for as long as necessary until an acknowledgement is received. This way, the call can be delivered regardless of temporary radio disturbances, for instance, and system reliability reaches a high level.

A customer terminal may send information also on its own state to the server, which allows the server to monitor possible faults. The customer terminal may send status information regularly to the server, which allows the server to detect the absence of data transmission at a specific time. Alternatively, the server may request the customer terminal to send information on its state upon request or at pre-set times that have been programmed into the server.

The server, 210, also has the corresponding interface, 216, for data exchange with service terminals, 270. The data exchange can utilise a variety of transmission methods, such as the GSM, UMTS, and Internet networks, 260. The service terminals, 270, can be terminal devices regularly operating on the network, such as mobile communication devices. The data exchange between the service terminals and the server can take place in an unencrypted or encrypted way uni- or bi-directionally.

All terminal devices in the system are continuously turned on in the most affordable way to ensure the operation of the system under all circumstances. The terminal devices can be permanently turned on in such a way that turning them off requires a tool. This minimises interruptions caused by faults and results in high system reliability. The terminal devices are affordably battery-operated, whereby their battery operation ensures their availability even during extended power outages. The capacity of the batteries of the terminal devices can be designed so as to allow long operation times without recharging.

A functionality according to the invention is attained with the devices mentioned here and by saving the programs that control the invention-corresponding process on the system devices. The programming of the server and terminal devices per se is known to person skilled in the art, and such skilled person can carry out the functions of the invention on the basis of the description herein.

Additional data pertaining to the service providers, according to the invention, can be stored as parameters or tables with logical association with each service provider. One option is to group service providers also on the basis of, for example, the service to be offered, in which case the additional data are contained in the grouping. In this scenario, the selection of service provider takes place affordably by means of selecting suitable service provider groups.

The above presents only some of the embodiments possible for a solution according to the invention. The principle of the invention, naturally, can be altered within the scope of protection defined by the claims—for example, with respect to the details of the implementation as well as the application areas. For example, the invention can be implemented using a wide range of transmission methods, including radio-based and wired data transmission, as well as data transmission over private or public transmission channels. Furthermore, the system can be utilised for handling information other than call and assignment messages. The system also allows for relaying voice and image data between the customer site and the service provider.

The invention claimed is:

1. A method for relaying and managing service calls, comprising the steps of:
   a customer terminal sending a call, the call including a call message sent to a server, the call message comprising call information including identification data of the customer terminal and a reason for the call, the reason including a specified desired service;
   a service terminal receiving an assignment based on the customer terminal sending the call, wherein,
   the call information is transmitted from the customer terminal to the server,
   the sever selects a service provider by the server reading additional service provider data which indicates a suitable service provider that provides the specified desired service, in which server-based data on the service providers comprise data for establishing a connection to the service provider's service terminal and the additional service provider data, whereby the call arriving at the server activates the server's selection of the suitable service provider on the basis of the data contained in the call and said additional service provider data, and
   the server sending the assignment to the service terminal in accordance with contact information of selected service provider, wherein the additional service provider data comprises information concerning the particular service providers,
   the selected service provider providing the desired service; and
   the server maintaining i) a log memory storing a log of received calls, assignments sent from the server to each service provider, and assignment acknowledgements sent by each service provider to the server acknowledging reception of the assignments, and ii) service-completion acknowledgements, sent by each service provider to the server, acknowledging completion of services corresponding to the assignments sent to each service provider.

2. The method according to claim 1, characterised by determining of the customer's position and, as said additional service provider data, the service provider's position, and said selection being based on this position information.

3. The method according to claim 2, characterised by selecting the service provider closest to the position of the customer terminal.

4. The method according to claim 1, characterised by said additional data comprising data concerning the services provided by the service provider, whereby the selection of the service provider will be based at least on the call-contained data concerning the service need and said additional data on the services provided by the service provider.

5. The method according to claim 1, characterised by the additional service provider data stored on the server comprising presence information on the service provider's availability at a specific time, whereby the selection of service provider is based on this presence data.

6. The method according to claim 1, characterised by the additional service provider data stored on the server comprising information on the service provider's load at the time of inspection, whereby selection of service provider is based on this load situation.

7. The method according to claim 1, characterised by the additional service provider data stored on the server, comprising information on the number of services carried out by the service provider in a pre-set period of time, whereby the selection of service provider is based on this number of services carried out by the service provider.

8. The method according to claim 1, characterised by the service provider having access for storing and altering the data pertaining to the service provider in question on the server.

9. The method according to claim 1, characterised by encryption of the data exchange between the customer terminal and the server, as well as between the server and the service terminal.

10. The method according to claim 1, characterised by the server comprising means for activating the customer's operating device on the basis of an incoming call.

11. The method according to claim 1, characterised by the server comprising means for activating the customer's operating device on the basis of data stored on the server.

12. The method according to claim 1, characterised by the call comprising environment data concerning the customer's premises, such as the state of the fire alarm device, stove, indoor temperature and humidity, and/or the opened/closed state of the exterior doors or windows.

13. The method according to claim 1, characterised by the invoicing for the services taking place on the basis of this log information.

14. The method according to claim 1, characterised by relaying a call to the server through a control centre that serves as a base station.

15. The method according to claim 1, characterised in that the information exchange between the customer terminal and the server is bi-directional.

16. The method according to claim 1, characterised by the customer terminal being located on the basis of the radio data exchange between the customer terminal and the control centre that serves as a base station, whereby the positioning information is relayed to the server.

17. The method according to claim 1, characterised by the customer terminal sending information on its own state to the server at regular intervals for monitoring the customer terminal's operation.

18. The method according to claim 1, characterised in that the customer terminal can be activated to control an operating device.

19. A system for relaying and managing service calls that comprises customer terminals for sending calls and service terminals for receiving assignments that is characterised by the system comprising a server with memory storing the information of the service providers, which comprises data for establishing a connection to the service provider's service terminal and additional service provider data, with the system further comprising the means for relaying the call data from a customer terminal to the server, whereby the server is arranged to be activated on the incoming call and perform selection of a service provider on the basis of the data contained in the call and said additional data, and to send an assignment based on the data of the call to the service terminal in accordance with the contact information of the selected service provider, wherein the additional service provider data comprises information concerning the particular service providers, and service provider information stored in the server is configured to be changed without updating the customer terminals, the server further comprising:
i) a log memory storing a log of received calls, assignments sent from the server to each service provider, and assignment acknowledgements sent by each service provider to the server acknowledging reception of the assignments, and
ii) service-completion acknowledgements, sent by each service provider to the server, acknowledging completion of services corresponding to the assignments sent to each service provider.

20. The system according to claim 19, characterised by the system comprising means for determining the position of the customer terminal, whereby as one of the said additional data is the position of the service provider and said selection is carried out on the basis of said position information.

21. The system according to claim 20, characterised by comprising means for selecting the service provider closest to the position of the customer terminal.

22. The system according to claim 19, characterised by said additional data comprising information on the services provided by the service provider, whereby selection of the service provider shall be based at least on the call-contained data on the service need and the said additional data on the services provided by the service provider.

23. The system according to claim 19, characterised by the additional service provider data stored on the server comprising presence information related to the service provider's availability at a specific time, whereby the selection of service provider is based on said presence data.

24. The system according to claim 19, characterised by the additional service provider data stored on the server comprising information on the service provider's load at the time of inspection, whereby the selection of service provider is based on said load situation.

25. The system according to claim 19, characterised by the additional service provider data stored on the server comprising information on the number of services carried out by the service provider in a pre-set period of time, whereby the selection of service provider is based on the said number of services carried out by the service provider.

26. The system according to claim 19, characterised by the service provider having access for storing and altering the data pertaining to the service provider in question on the server.

27. The system according to claim 19, characterised by encryption of the data exchange between the customer terminal and the server as well as the data exchange between the server and the service terminal.

28. The system according to claim 19, characterised by the server comprising means for activating the customer's operating device on the basis of an incoming call.

29. The system according to claim 19, characterised by the server comprising means for activating the customer's operating device on the basis of the information stored on the server.

30. The system according to claim 19, characterised by the call comprising environment data concerning the customer's premises, such as the state of the fire alarm device, stove, indoor temperature and humidity, and/or the opened/closed state of the exterior doors or windows.

31. The method according to claim 19, characterised by comprising means for invoicing the customer for the services on the basis of said log data.

32. The system according to claim 19, characterised by comprising means for relaying a call to the server through a control centre that serves as a base station.

33. The system according to claim 19, characterised in that the information exchange between the customer terminal and the server is bi-directional.

34. The system according to claim 19, characterised by the system comprising means for determining the location of a customer terminal on the basis of the radio data exchange between the customer terminal and the control centre that serves as a base station, as well as means for relaying the positioning data to the server.

35. The system according to claim 19, characterised by the customer terminal comprising means for sending information on its own state to the server at regular intervals for monitoring the customer terminal's operation.

36. The system according to claim 19, characterised in that the customer terminal can be activated to control of an operating device.

37. A server for relaying and managing service calls in a system that comprises customer terminals for sending calls and service terminals for receiving assignments, the server having:
- memory for storing the information of the service providers, which contains data for establishing a connection to the service provider's service terminal and additional service provider data,
- means for receiving call data from a customer terminal,
- server-based data comprising information concerning the particular service providers, and
- service provider information stored in the server configured to be changed without updating the customer terminals, wherein the server is arranged
i) to be activated upon the incoming call and select a service provider on the basis of the data contained in the call and the said additional data, and
ii) to send an assignment based on the data of the call to the service terminal in accordance with the contact information of the selected service provider, the server further comprising:
i) a log memory storing a log of received calls, assignments sent from the server to each service provider, and assignment acknowledgements sent by each service provider to the server acknowledging reception of the assignments, and
ii) service-completion acknowledgements, sent by each service provider to the server, acknowledging completion of services corresponding to the assignments sent to each service provider.

38. The server according to claim 37, characterised by further comprising means for controlling the customer's operating device on the basis of the information comprised in the received call and/or the control data stored on the server.

39. The server according to claim 37, characterised by comprising means for determining the customer's position, and the service provider's position.

* * * * *

UNITED STATES PATENT AND TRADEMARK OFFICE
CERTIFICATE OF CORRECTION

PATENT NO. : 8,489,061 B2  Page 1 of 1
APPLICATION NO. : 12/162714
DATED : July 16, 2013
INVENTOR(S) : Kauko Valtonen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Eighth Day of September, 2015

Michelle K. Lee
*Director of the United States Patent and Trademark Office*